March 13, 1951 G. F. FAWCETT 2,544,782
FISH LURE
Filed Aug. 30, 1947
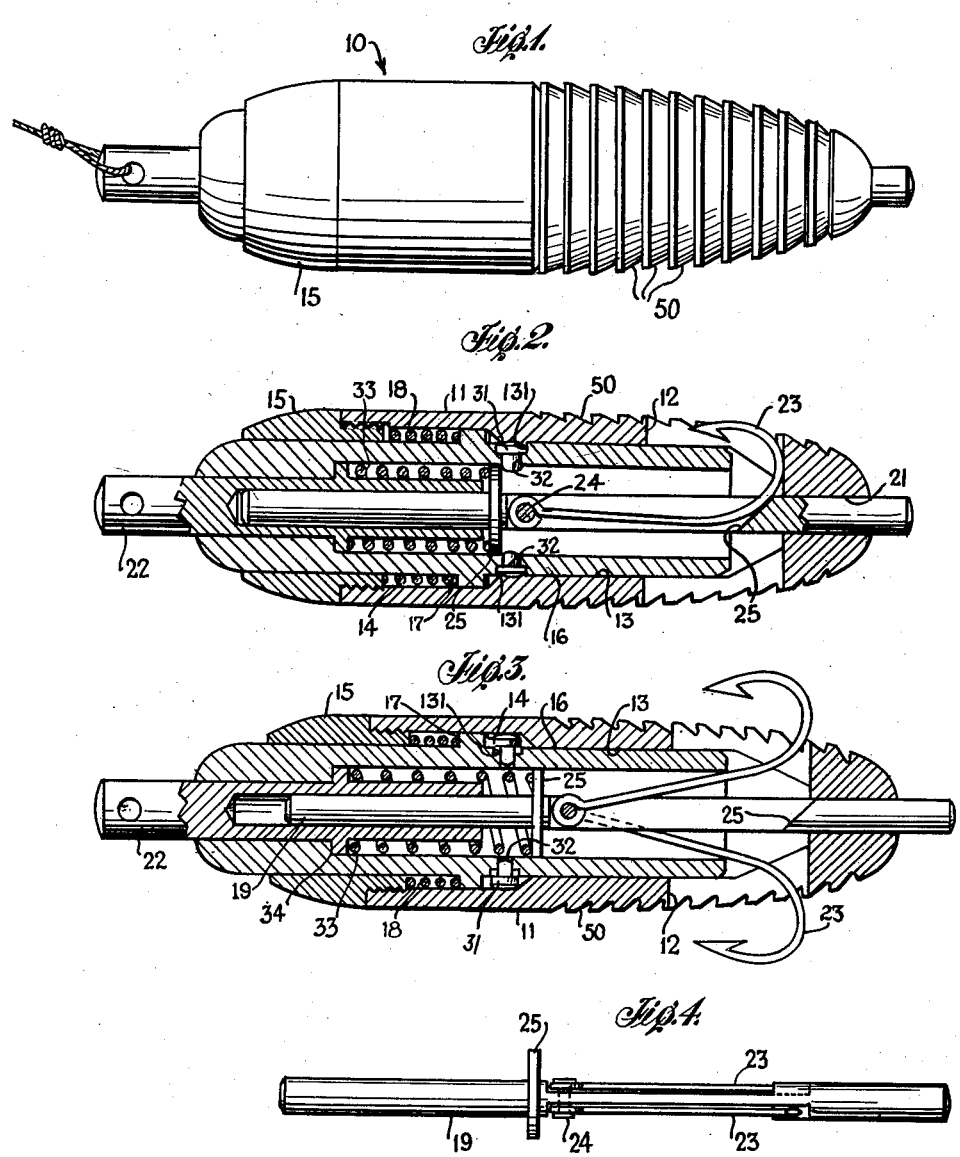
INVENTOR
GEORGE F. FAWCETT
BY West & Oldham
ATTORNEYS

UNITED STATES PATENT OFFICE 2,544,782

FISH LURE

George F. Fawcett, Euclid, Ohio, assignor to The Carpenter Manufacturing Corporation, Cleveland, Ohio, a corporation of Ohio Application August 30, 1947, Serial No. 771,407

3 Claims. (Cl. 43—36)

This invention relates to artificial fish lures, especially to artificial lures of the type wherein the fish hooks are adapted to be retained in an inoperative position until the instant that a fish strikes the lure.

Heretofore, various types of weedless fish lures have been provided wherein the hooks are placed or retained in an inoperative position until the bait is to be used, or special guards may be provided to prevent weeds from engaging with the fish hooks. Other devices also have been provided for rendering fish hooks on artificial lures safe to handle when the fish lure is being stored, or attached to a line. All of such means known to me have been relatively unsuccessful because the guards for the fish hooks might themselves be weed catching or hooking devices, the means for rendering the fish hooks active might not operate at the proper time, or else might operate prematurely, the fish hook safety device might interfere with the operation of the fish lure, or it might be objectionable for various other reasons.

The general object of the present invention is to provide a novel, attractive fish lure which is characterized by a positive locking of the fish hooks in inoperative position, which locking is adapted to be automatically released when a fish strikes at, or hits the fish lure.

A further object of the invention is to provide an inexpensive, easily produced, and assembled fish lure of the weedless variety, which lure has desirable fish catching properties.

A further object of the invention is to provide a fish lure which can be easily carried or stored without danger of hooking or snagging the fish hook barbs on any object.

The foregoing and other objects and advantages of the invention will be made apparent as the specification proceeds.

Attention now is directed to the accompanying drawings, wherein:

Fig. 1 is an elevation of a fish lure embodying the principles of my invention;

Fig. 2 is a longitudinal section of the fish lure with the hooks in inoperative position;

Fig. 3 is a longitudinal section of the fish lure with the fish hooks started to be released; and Fig. 4 is an elevation of the hook mounting piston.

Referring specifically to the details of the device shown in the drawings, a fish lure indicated generally by the numeral 10 is provided and it includes or has a hollow cover member 11 that is provided with a pair of diametrically opposed slots 12, a bore 13, and a counterbore 14. The open end of the cover member 11 is closed by an end cap, or sleeve 15 which usually engages the cover member by a threaded connection so as to provide a tubular portion in the fish lure. A sleeve 16 is received in the bore 13 and is provided with means, such as a shoulder or flange 17 formed on its periphery, which flange 17 is admitted into the counterbore 14 but cannot move into the bore section 13 whereby such flange limits relative axial inward movement of the sleeve 16 with relation to the cover. To retain, resiliently, the sleeve 16 in its innermost position, resilient means such as a coil spring 18 is positioned between the end sleeve 15 and the flange 17 to urge such sleeve 16 to seat normally against the end of the counterbore 14, as shown in Fig. 2.

Another of the features of the invention is that a fish hook mounting device, such as a plunger, or piston 19, is received in the bore of the sleeve 16 for axial movement therein. The piston 19 is positioned in the lure 10 for axial movement by engagement with a hole 21 in the enclosed end of the cover 11 and with a plunger or piston guide 22 in the sleeve 16. This piston 19 pivotally mounts two hooks 23, one on each side of itself by means of a pin 24. That is, hooks 23 are positioned in cut-out sections 25 of the piston, as best shown in Fig. 4 so that they lie closely against such piston and the ends of such cut-out sections 25 are outwardly inclined as shown in Fig. 2 with relation to the adjacent hook so that as the piston 19 is moved toward the rear of the fish lure, the free ends of the fish hooks are expelled from the fish lure by the curved ends of the hooks bearing on the ends of the slots 12.

The piston guide 22 may have a small bore that is snugly received on the piston 19 to aid in positioning the hooks 23 in retracted position.

A salient feature of the invention is that positive means are provided for locking the piston 19 in the fish lure 10 so that the hooks 23 are in their retracted positions. To this end, headed lock pins 31 are carried in radially extending apertures 32 formed in diametrically opposed portions of the sleeve 16 with the heads of the locking pins 31 being received in recesses 131 formed in the periphery of this sleeve, as shown in Fig. 2. The locking pins 31 are of such length that the curved inner ends thereon extend into the bore of the sleeve 16 and engage with the head 25 of the piston 19 to prevent its movement thereby when the pins are in their locking position. However, when the sleeve 16 is moved axially outwardly of the cover 11, then the locking pins 31 can be forced out into the counterbore 14 at which time the piston head 25 can move by the inner ends of the locking pins. A resilient coil spring, or other equivalent member 33 is provided in the fish lure and it is positioned between the piston head 25 and a flange or shoulder 34 formed on the piston guide 22 whereby such spring normally urges the piston 19 and the hooks carried thereby to their outermost positions. The spring 33 is strong enough to force the piston 19 past the locking pins 31 by moving them radially outwardly when the sleeve 16 is moved in the cover 11 to place the pins 31 in the counterbore 14 and free for radially outward movement. By retaining the relative light weight spring 18 compressed, one can reset the lure by forcing the piston 19 and its associated means inwardly of the fish lure so as to snap the head 25 by the locking pins 31. The sleeve 16 and cover member 11 then should be released for relative movement and spring 18 will force the sleeve 16 inwardly of the fish lure to the position shown in Fig. 2, meanwhile the piston should be retained pushed into the lure by pressure on the outer end of the piston and such pressure can be released as soon as the sleeve 16 and cover member 11 are positioned as in Fig. 2.

In operation, it will be seen that the fish lure is drawn through the water by a slight force exerted on the piston guide 22, which action or force is not sufficient to compress the spring 18. However, when a fish or other animal would strike at or bite on the fish lure 10, its movement will be retarded and the pulling action exerted on the guide 22 will slide the sleeve 16 and associated means outwardly of the fish lure whereby the locking pins 31 will be moved into association with the counterbore 14. At that time, the force exerted on the pins 31 by the piston head 25 will force such locking pins radially outwardly of the fish lure whereby spring 33 will snap the piston 19 and hooks 23 to their outermost positions so that any fish biting the fish lure will be caught on such hooks.

It will be seen that the fish lure is so constructed and arranged that relative light retarding action on the fish lure will compress the spring 18 so as to release the locking pins 31 and permit the relatively heavy spring 33 to snap the fish lure into its operative position. Fig. 3 shows the hooks 23 in an operative position but the spring 33 may force the piston 19 farther towards the closed end of the cover 11 and such action will only force the hooks farther out of the lure.

It will be noted that a plurality of annular grooves 50 are formed in the outer surface of the cover 11 as they disguise the slots 12 and aid in giving the lure an attractive movement through the water. The lure may, of course, be formed from any suitable material and I have found various plastics to be very satisfactory for this use. As the hooks 23 are hidden as the lure is drawn through the water by a line attached to the guide 22, fish are not as wary of the lure as they are of artificial lures in general.

In accordance with the patent statutes, one complete embodiment of the invention has been described herein in detail. However, it will be understood that the scope of the invention is not limited to that example given herein, but that modification may be resorted to within the scope of the appended claims.

What is claimed is:

1. A fish lure comprising a hollow cover member having a bore and a counterbore, a sleeve having a piston guide provided with a shoulder positioned in said bore and being received in said cover member for relative axial movement, compression resilient means for normally resisting movement of said sleeve and cover member but for permitting relative axial movement therebetween, a piston member received in said sleeve for axial movement, one end of said piston member being mounted in and positioned by said cover member, a hook pivotally carried by said piston member, said cover member having a slot therein, said hook being received substantially within the slot in said cover member when said piston member and said cover member are in their normal relation, means for engaging said sleeve with a fish line, resilient means between the shoulder of said piston guide and said piston member for moving said piston member axially of said sleeve and cover member so as to position said hook externally of said cover member, and lock pins engaged with said sleeve and normally being positioned in the bore of said cover member, said lock pins normally extending into the bore of said sleeve for preventing axial movement of said piston member by said second-named resilient means until said first-named resilient means are appreciably compressed, said piston member being adapted to push said lock pins out of lock position when said sleeve is moved with relation to said cover member so as to position said lock pins in the counterbore of said cover member.

2. A fish lure comprising a hollow cover member having a bore, a sleeve having a piston guide provided with a shoulder positioned in said bore and being received in said cover member for relative axial movement, compression resilient means for normally resisting movement of said sleeve and cover member but for permitting relative axial movement therebetween, a piston member received in said sleeve for axial movement, hooks pivotally carried by said piston member, said cover member having slots therein, said hooks being received substantially within the slots in said cover member when said piston member and said cover member are in their normal relation means for engaging said sleeve with a fish line, resilient means between the shoulder of said piston guide and said piston member for moving said piston member axially of said sleeve and cover member so as to position said hooks externally of said cover member, and lock pins engaged with said sleeve and normally extending into its bore for preventing movement of said piston member by said second-named resilient means until said first-named resilient means are appreciably compressed by relative movement of said cover member and sleeve at which time said piston member is adapted to push said lock pins out of lock position.

3. A fish lure comprising a closed end tubular cover member having a longitudinally extending slot formed therein, a sleeve received in said cover member for relative axial movement, compression resilient means for normally resisting movement of said sleeve and cover member but for permitting relative axial movement therebetween, a piston member positioned in said sleeve and said cover member for axial movement, a hook carried by said piston member and adapted to be positioned thereby substantially within the slot in said cover member, resilient means for moving said piston member so as to force said hook externally of said cover member, and radially movable lock means for preventing movement of said piston member by said second-named resilient means until said first-named means are appreciably compressed by relative movement of said cover member and sleeve and said sleeve is least engaged with said cover member, said cover member having a counterbore for reception of said lock means and positioning of same in inoperative position.

GEORGE F. FAWCETT.

REFERENCES CITED

The following references are of record in the file of this patent:

UNITED STATES PATENTS

| Number | Name | Date |
| --- | --- | --- |
| 700,412 | Fischer | May 20, 1902 |
| 1,609,160 | Deckman | Nov. 30, 1926 |
| 2,301,764 | Wainwright | Nov. 10, 1942 |